US011893651B2

(12) United States Patent
Paras Ram et al.

(10) Patent No.: US 11,893,651 B2
(45) Date of Patent: Feb. 6, 2024

(54) SYSTEMS FOR COLLECTING DIGITAL WITNESS STATEMENTS AND DETECTING ELECTRONIC RESOURCES REFERENCED DURING COLLECTION

(71) Applicant: MOTOROLA SOLUTIONS, INC., Chicago, IL (US)

(72) Inventors: Anoop Sehgal Paras Ram, Ipoh (MY); Jin Hoe Phua, Chenderiang (MY); Woei Chyuan Tan, Bayan Lepas (MY); Jonathan Chan, Bukit Mertajam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 176 days.

(21) Appl. No.: 17/657,765

(22) Filed: Apr. 4, 2022

(65) Prior Publication Data
US 2023/0316443 A1    Oct. 5, 2023

(51) Int. Cl.
*G06Q 50/26* (2012.01)
*G06F 3/0484* (2022.01)
*G06F 40/20* (2020.01)
*G06F 40/166* (2020.01)

(52) U.S. Cl.
CPC ........... *G06Q 50/26* (2013.01); *G06F 3/0484* (2013.01); *G06F 40/166* (2020.01); *G06F 40/20* (2020.01)

(58) Field of Classification Search
CPC ..... G06Q 50/26; G06F 3/0484; G06F 40/166; G06F 40/20
See application file for complete search history.

(56) References Cited

U.S. PATENT DOCUMENTS

| 8,417,776 | B2 * | 4/2013 | Womack ................. G06F 21/64 |
| | | | 709/215 |
| 8,775,631 | B2 | 7/2014 | Luna et al. |
| 9,326,189 | B2 | 4/2016 | Luna et al. |
| 9,661,103 | B2 | 5/2017 | Luna et al. |
| 9,960,977 | B2 | 5/2018 | Tubi et al. |
| 10,841,359 | B2 | 11/2020 | Woodman et al. |
| 2019/0372946 | A1 * | 12/2019 | Nadeau ................. H04L 9/0894 |
| 2020/0068165 | A1 | 2/2020 | Green et al. |

FOREIGN PATENT DOCUMENTS

| DE | 102016003723 A1 * | 9/2017 | ........... G11B 27/322 |
| WO | WO-2019212523 A1 * | 11/2019 | ........... G06F 11/3006 |

\* cited by examiner

*Primary Examiner* — Florian M Zeender
*Assistant Examiner* — Emily M. Kraisinger

(57) ABSTRACT

Systems, methods, and devices disclosed herein can collect digital witness statements (e.g., on a witness's own mobile device), detect when witnesses are accessing electronic resources during preparation of those digital witness statements, elicit input from witnesses to identify the electronic resources accessed, and detect portions of the digital witness statements that may have been influenced by data procured from those electronic resources. Furthermore, the systems, methods, and devices disclosed herein can generate an indication of consistency between content found in the electronic resources and content found in the digital witness statements so that a degree to which the electronic resources influenced the witness statements can be inferred.

20 Claims, 5 Drawing Sheets

US 11,893,651 B2

SYSTEMS FOR COLLECTING DIGITAL WITNESS STATEMENTS AND DETECTING ELECTRONIC RESOURCES REFERENCED DURING COLLECTION

BACKGROUND

Law enforcement agencies often seek to collect statements from witnesses who were present at the scenes of incidents that are being investigated. Depending on the nature of an incident, the location of the incident, the time of day when the incident occurred, and many other factors, there may be hundreds of witnesses from whom investigators seek to collect statements. Information found in any one of those statements may be instrumental in helping investigators reconstruct how the incident occurred and in ultimately bringing about a resolution to a case file for the incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
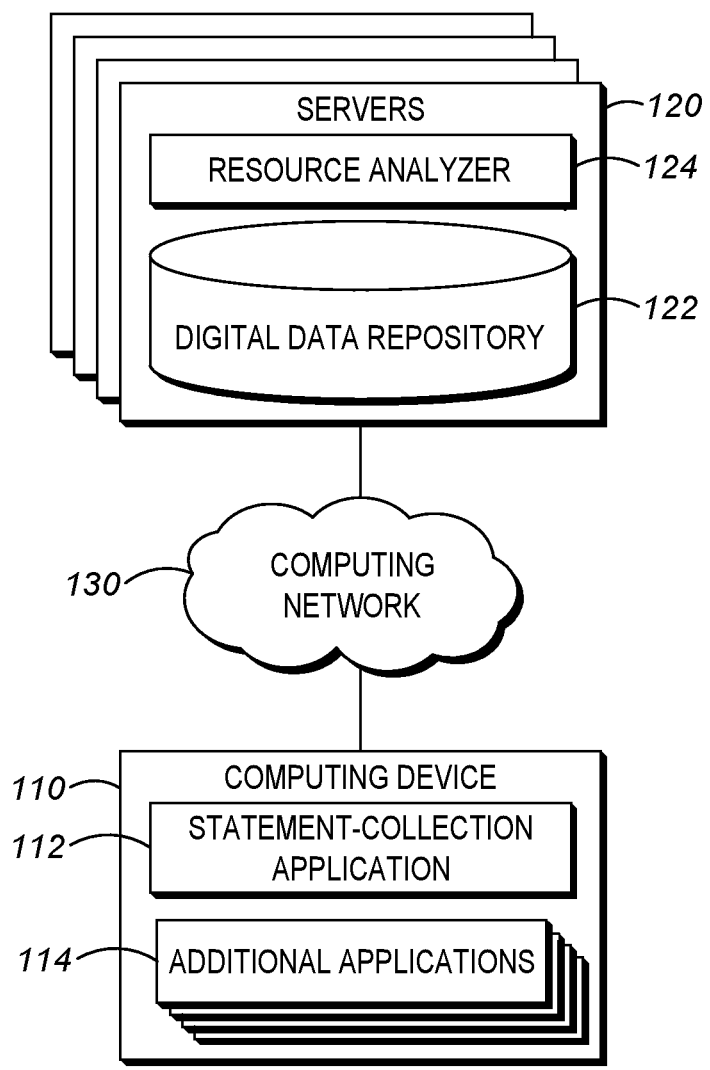
FIG. 1 illustrates a computing environment in which systems described herein may operate, according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Modern technology (e.g., computers, smart phones, voice recorders, and digital cameras) can facilitate fast and accurate collection of digital witness statements, especially if witnesses are able to use their own personal devices to record and submit those statements. An officer who arrives at the scene of an automobile accident may, for example, provide a digital link (e.g., a hyperlink) to a person who witnessed the accident and ask the witness to use the witness's own device to follow the link to provide a digital witness statement. The officer may provide the link via a Quick Response (QR) code or hand a tablet computer to a person who witnessed the accident and ask the person to record a statement via the tablet computer (e.g., by taking a video of the person giving the statement via a digital camera in the tablet computer, capturing the statement in an audio format via a microphone in the tablet computer, or typing the statement via a virtual keyboard displayed on a touch screen of the tablet computer). Statements that are recorded in digital formats can be backed up easily and distributed to collaborative investigators in different geographical locations quickly via modern computing networks. Furthermore, some digital formats allow investigators to search rapidly for content of interest (e.g., words and phrases).

While devices such as smart phones and tablet computers can facilitate rapid recordation, storage, and distribution of digital witness statements, there are some disadvantages to collecting digital witness statements in this manner. For example, there may be many applications installed on the witness's device. The device may have the capacity to execute multiple applications concurrently and the witness may be able to switch back and forth between the applications that are currently being executed. A witness may access data from some of those applications while the witness is recording a statement. The accessed data may influence the content of the witness's statement. This influence may be either deliberate or unwitting on the part of the witness, but the influence may taint or the value or reduce the reliability of the witness's statement regardless of whether the witness is conscious of the influence.

For example, suppose a witness opens a first application (e.g., a browser or a dedicated application for recording digital witness statements) for the purpose of providing a digital witness statement. While providing the statement, the witness remembers that a suspect was carrying a handgun. The witness, with good intentions, wants to be able to name the specific model name of the handgun, so the witness switches to a second application (or, if the first application is a browser, a second tab in the browser) and uses an Internet search engine to search for images of handguns of different types. Upon identifying the model name of a gun shown in the search results that vaguely resembles the handgun the witness saw the suspect carrying, the witness switches back to the first application and adds the model name to the digital witness statement without explaining how the witness chose the model name based on the search results.

In this scenario, the digital witness statement may be problematic for several reasons. First, the witness may have unwittingly provided an incorrect model name. This may cause investigators to narrow their search for suspects to registered owners of guns of the incorrect model name. Furthermore, the specificity of the model name may induce a prosecutor to rely unduly on the digital witness statement in the process of building a case against a suspect. If the witness does not mention how the model name was determined until the witness is being cross-examined by a defense attorney during a trial, the defense attorney may successfully undermine the credibility of the witness and therefore undermine the chances of the suspect being convicted.

In another scenario, the witness may access the second application under duress or with a sinister motive. For example, suppose the witness is an accomplice to the suspect and the witness receives a text message from the suspect via a short message service (SMS) while the witness is providing the statement. Also suppose that a SMS application is the second application (e.g., the witness switches to the SMS application to read the text before completing the digital witness statement in the first application). The text message may instruct the witness to provide a statement that matches a false narrative that the suspect plans to give to officers if the suspect is questioned. Alternatively, if the witness is not an accomplice, suppose the suspect recognized the witness at the scene and the text message includes both an instruction to provide a statement that matches the false narrative and a threat of violence that will be carried out if the witness does not follow the instruction. In either scenario, valuable information that might have been provided by the witness but for the text message will likely be omitted from the digital witness statement.

One potential approach for addressing this problem would be to make the first application be dedicated software that prevents the witness from opening other applications or switching to applications while the first application is executing. Such dedicated software could also use screen-recording functionality and key-logging functionality to record the witness's activities on the device while the witness is in the process of providing the statement. Depending on the device's operating system, the device may have to be rebooted multiple times for software of this type to be executed successfully. This approach would be similar to the types of software that are used, for example, in standardized testing scenarios. However, due to the relative invasiveness and complexity of such software, many witnesses may have privacy concerns or may find measures like rebooting to be disruptive and unduly inconvenient. As a result, many witnesses may be unwilling to install this type of software on their personal devices and may even decline to provide statements just to avoid using the software.

Thus, it would be desirable to have a technical method, device, and system that can collect digital witness statements, detect when witnesses are accessing electronic resources during preparation of those digital witness statements, elicit input from witnesses to identify the electronic resources accessed, and detect portions of the digital witness statements that may have been influenced by data procured from those electronic resources. Furthermore, it would be desirable for the technical method, device, and system to accomplish these functions in a manner that is not unduly complicated and is relatively non-invasive for personally owned devices. The methods, devices, and systems disclosed herein provide these advantages and other advantages that will be apparent in the disclosure below.

FIG. 1 illustrates a computing environment 100 in which systems described herein may operate, according to one example. As shown, the computing environment 100 includes a computing device 110 and servers 120. The servers 120 may be in communication with each other and with the computing device 110 via the computing network 130. The computing device 110 may be, for example, a smart phone, a tablet computer, a laptop computer, a desktop computer, or some other type of electronic device that is capable of receiving user inputs (e.g., text, audio, or video) through Input/Output (I/O) peripherals (e.g., microphones, touch screens, keyboards, computer mice, virtual reality headsets, etc.) and storing those inputs into a digital format.

The statement-collection application 112 is a software application that, when accessed via the computing device 110, allows a user to provide a digital witness statement in response to a request (e.g., from an officer of the law). The digital witness statement may be provided in a textual format (e.g., via a keyboard or a virtual keyboard displayed on a touch screen), an audio format (e.g., via a microphone), a visual format (e.g., via a camera or a peripheral such as a touch screen that allows the user to draw digital sketches), or a combination thereof. The statement-collection application 112 may be a browser, a web application accessed through a browser, or an application that executes locally on the computing device 110. Persons of skill in the art will understand that various components of the statement-collection application 112 may be executed on the computing device 110 or the servers 120 without departing from the spirit and scope of this disclosure.

The additional applications 114 may comprise many different types of consumer applications that can execute concurrently with each other and with the statement-collection application 112 on the computing device 110. The additional applications may comprise, for example, media players, graphics editors, image viewers, social media applications, word processors, spreadsheets, instant-messaging applications, and other types of applications. The additional applications may allow a user to access electronic resources such as web pages, social media posts, word-processing documents, SMS messages, digital still images, digital videos, digital audio recordings, digital spreadsheets, digital slide decks, and other types of electronic resources. Some electronic resources may be stored locally on the computing device 110, while other electronic resources may be stored remotely (e.g., by cloud-computing services) and may be streamed or downloaded to the computing device 110 via the computing network 130.

Persons of skill in the art will understand that the computing network 130 may comprise a wide area network (WAN) such as the Internet, a local area network (LAN), an enterprise network, a virtual private network (VPN), an Integrated Services Digital Network (ISDN) (e.g., which can transfer voice, video, and data over a digital connection), some other type of digital or analog communication network, or a combination thereof.

As one example of how the computing device 110 and the servers 120 may operate, consider the following scenario. Suppose the user commences recording a digital witness statement via the statement-collection application 112. Before the user finishes recording the digital witness statement, the user switches the statement-collection application 112 to a background state and switches one of the additional applications 114 to a foreground state. When the statement-collection application 112 is switched to the background state, the statement-collection application 112 inserts an indication of the switch to the background state into metadata that is associated with the digital witness statement. The indication of the switch to the background state may comprise, for example, a timestamp indicating when the switch to the background state occurred. If the statement-collection application 112 continues recording while in the background state, the indication may also comprise a tag that identifies the start of a section of the digital witness statement that was recorded while the statement-collection application 112 was in the background state.

While the statement-collection application 112 is in the background state, the user accesses an electronic resource through one of the additional applications 114. There are many possible reasons why the user chose to access the electronic resource before the user finishes recording the digital witness statement. Some possible reasons might be relatively innocuous (e.g., the user is merely distractible and wanted to take a break from preparing the digital witness statement), while other reasons may be sinister (e.g., the user may want help fabricating a narrative). Regardless of the user's reasons, though, an agency that requested the user statement may want to be apprised of the user's switching the statement-collection application 112 into the background state while recording the digital witness statement.

After accessing the electronic resource, the user switches the statement-collection application 112 back to the foreground state, finishes recording the digital witness statement, and provides an input to the statement-collection application 112 indicating that the user is ready to submit the digital witness statement. When the statement-collection application 112 is switched back to the foreground state, the statement-collection application 112 inserts an indication of the switch back to the foreground state into the metadata associated with the digital witness statement. The indication of the switch back to the foreground state may comprise, for example, a timestamp indicating when the switch back to the foreground state occurred. If the statement-collection application 112 continued recording while in the background state, the indication may also comprise a tag that identifies the end of the section of the digital witness statement that was recorded while the statement-collection application 112 was in the background state.

In addition, the statement-collection application 112 displays an electronic request to the user to prompt the user to submit the electronic resource via a user-interface element provided by the statement-collection application 112. The user-interface element may be, for example, a file upload field (i.e., a file select field), a file upload button, a text field into which a uniform resource locator (URL) can be inserted, or some other type of programming construct that allows files, links, or other electronic resources to be uploaded. Application programming interfaces (APIs) such as the File API for Javascript and other APIs or software libraries may be used to generate the user-interface element. The user may submit (e.g., upload) the electronic resource in the form of a file, a link, an image (e.g., a screenshot), or some other format. The digital witness statement and the electronic resource may then be uploaded via the network 130 to the digital data repository 122 in the servers 120.

For clarity in illustration, the digital data repository 122 is shown as a single block. However, persons of skill in the art will recognize that the digital data repository 122 may be spread across many different geographical locations. Note that the digital data repository 122 may be stored on a combination of non-volatile storage elements (e.g., disc drives, removable memory cards or optical storage, solid state drives (SSDs), network attached storage (NAS), or a storage area-network (SAN)). Furthermore, data stored in the digital data repository 122 may be stored in any combination of databases (e.g., relational or non-relational), flat files, or other formats.

Persons of skill in the art will recognize that there are many different APIs that may be used by the statement-collection application 112 to detect when the statement-collection application 112 changes from a foreground state to a background state (and vice versa). For example, if the computing device 110 executes the Windows® operating system, the Page Visibility API provides functionality for determining whether a browser tab is in a visible state (which may be considered a foreground state) or a hidden state (which may be considered a background state). Other web APIs define onfocus events (which may signify when an element of an application goes into a foreground state) and onblur events (which may signify when an element of an application goes into a background state).

In another example, if the computing device 110 executes the iOS® operating system, there are a number of APIs provided by iOS® that may be used. These APIs provide notification functions such as didActivateNotification and willDeactivateNotification that indicate when a scene is active on a screen responding to a user (which may signify that an application is in a foreground state) or when an application has resigned the active state (which may signify that the application is in a background state). Other notification functions such as willConnectNotification and didConnectNotification allow detection of when a scene is added (which may signify that an application is in a foreground state) and when a scene is removed (which may signify that the application has entered a background state), respectively. Also, the notification functions willEnterForegroundNotification and didEnterBackgroundNotification allow an application to detect whether the application is going into the foreground (a foreground state) or the background (a background state), respectively.

In another example, if the computing device 110 executes an Android® operating system, the ActivityLifecycleCallbacks API may be used. Specifically, the onPause (background state) and OnResume (foreground state) events may be used to identify transitions between a background state and a foreground state. Since ActivityLifecycleCallbacks only handles a single activity, it may be preferable to couple this approach with the JobIntentService API to detect transitions between different activities for greater accuracy in detecting true transitions.

The example APIs listed above for detecting transitions between foreground states and background states are provided for illustrative purposes only. Persons of skill in the art will understand that other APIs or programming constructs may be used to detect state transitions without departing from the spirit and scope of this disclosure.

Once the digital witness statement and the electronic resource are received at the digital data repository 122, the resource analyzer 124 may compare the content found in the electronic resource to the content found in the section of the digital witness statement that was recorded while the statement-collection application 112 was in the background state. Based on the comparison, the resource analyzer 124 generates an indication of consistency between the content of the electronic resource and the content found in the section of the digital witness statement and inserts the indication of consistency into the metadata associated with the digital witness statement.

Depending on the nature of the electronic resource and the format of the digital witness statement, there are many different ways that the content comparison may be accomplished. For example, suppose the metadata associates with the digital witness statement includes application identifiers for the additional applications 114 that were executing concurrently with the statement-collection application 112 while the digital witness statement was being recorded. The resource analyzer 124 may compare those application identifiers to an application identifier associated with the electronic resource. The application identifier associated with the electronic resource may be identified in a number of ways. In one example, if the electronic resource is a file, the resource analyzer 124 may select an application identifier of an application that is associated with a file type of the file (e.g., the application that is used to open files of the file type by default on the computing device 110). In another example, if the electronic resource is a URL, the resource analyzer 124 may select an application identifier of a default browser that is installed on the computing device 110. In these examples, the indication of consistency may comprise a Boolean value that indicates whether the application identifier associated with the electronic resource matches one of the application identifiers for the additional applications 114.

In another example, suppose the resource analyzer 124 identifies text that is found in the electronic resource. If the electronic resource includes a text file, the resource analyzer 124 may extract text from the text file without performing any computationally intensive preprocessing actions. If the electronic resource includes an image file, the resource analyzer 124 may apply optical character recognition (OCR) techniques to extract text from the image file. If the electronic resource includes an audio file or a video file that includes audio data, the resource analyzer 124 may apply speech-to-text (e.g., voice recognition) techniques to extract text from the audio file (or video file). The resource analyzer 124 may similarly extract text from the digital witness statement (e.g., by using OCR or speech-to-text techniques). Next, the resource analyzer 124 compares the text extracted from the electronic resource to the text extracted from the digital witness statement and generates a metric that serves as the indication of consistency. For example, the resource analyzer 124 may use Latent Dirichlet Allocation (LDA) to infer a topic for the text extracted from the electronic resource and a topic for the text extracted from the digital witness statement. In this example, the metric may indicate whether the inferred topics are a match or are similar (e.g., are child topics of the same parent topic in a hierarchy of topics). Persons of skill in the art will recognize that other approaches for topic modeling may be used instead of or in combination with LDA in this example, such as Latent Semantic Analysis (LSA), Probabilistic Latent Semantic Analysis (PLSA), and Correlated Topic Model (CTM).

In another example, the resource analyzer 124 may compile a list of words that appear in both the text extracted from the electronic resource and the text extracted from the digital witness statement. The resource analyzer 124 may remove stop words (i.e., common words that are generally ignored by natural-language processing programs, such as "the" and "an") from the list, if desired, and then count the number of words on the list. The number of words on the list may be used directly as the metric that serves as the indication of consistency. Alternatively, the indication of consistency may be a Boolean value that indicates whether the number of words meets a threshold.

In another example, the resource analyzer 124 may perform an edit-distance alignment of the text extracted from the electronic resource and the text extracted from the digital witness statement (e.g., using the Levenshtein distance algorithm). An output of the edit-distance alignment, such as the Levenshtein distance, may serve as the indication of consistency.

Persons of skill in the art will recognize that the resource analyzer 124 may use other approaches for determining the indication of consistency between the text extracted from the electronic resource and the text extracted from the digital witness statement without departing from the spirit and scope of this disclosure. For example, string tiling, the Karp-Rabin algorithm, Haeckel's algorithm, N-grams, and other approaches may be used.

Persons of skill in the art will also recognize that there are many natural-language software tools that could readily be used to achieve the text extraction and text analysis functions ascribed to the resource analyzer 124 without undue experimentation. The Natural Language Toolkit (NLTK), SpaCy, TExtBlob, Textacy, and PyTorch-NLP are several examples of open-source tools that are available in the Python programming language, although there are many other Natural Language Processing (NLP) software tools available in many other programming languages. Such NLP tools may use many different techniques to extract features from natural-language data. For example, vectorization techniques such as Bag-of-Words, Term Frequency-Inverse Document Frequency (TF-IDF), Word2Vec, Global Vectors for word representation (GloVe), and FastText may be used to extract features. Techniques such as tokenization (e.g., N-gram tokenization), lemmatization, stemming, and part-of-speech tagging may be used to extract features in addition to, or as part of, vectorization techniques. Features that are extracted from natural-language data can be used as input for machine-learning components of NLP tools that perform Named Entity Recognition (NER) to identify entities such as people, locations, companies, and dates that are mentioned in natural-language data. Persons of skill in the art will also understand that features may be digitally represented a variety of ways. For example, a feature may be represented by an integer, a real number (e.g., decimal), an alphanumeric character, or a sequence of alphanumeric characters. Features may also be discretized, normalized (e.g., converted to a scale from zero to one), or preprocessed in other ways.

Also note that the resource analyzer 124 is shown as a software module that is executed on the servers 120 because the servers are likely to have ample resources (e.g., processors, memory, and storage) for performing any computationally intensive tasks that are attributed to the resource analyzer 124. However, the resource analyzer 124 (or a part thereof) may also be executed on the computing device 110 without departing from the spirit and scope of this disclosure. In some examples, the resource analyzer 124 may even be a component of the statement-collection application 112.

In the example described above, the statement-collection application 112 collects a digital witness statement, detects when the user are accesses an electronic resource during the process of recording the digital witness statement, requests that the user provide the electronic resource via a user-interface element, and inserts indicia of a section of the digital witness statement that was recorded while the electronic resource was being accessed. Furthermore, the resource analyzer 124 determines a degree of consistency between the electronic resource and the digital witness statement and records an indication of that degree in meta-data associated with the digital witness statement. In addition, the statement-collection application 112 and the resource analyzer 124 function in is not unduly complicated from the perspective of the user and do not oblige the user to forfeit the ability to execute other applications in parallel with the statement-collection application 112 on the computing device 110 while the user is recording the digital witness statement.

Figure 2:
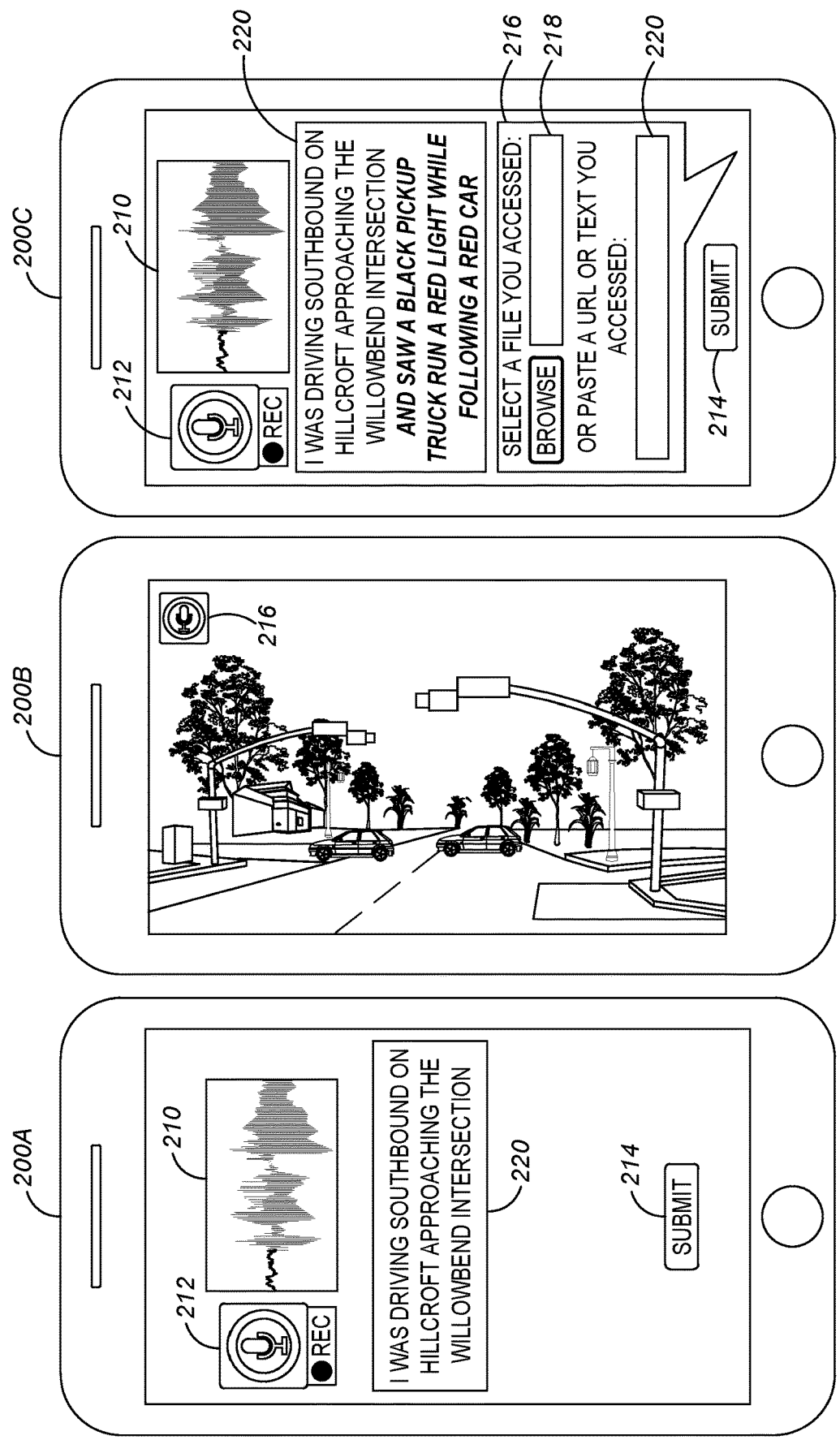
FIG. 2 illustrates a sequence of screen views that may appear on the digital display of a mobile device while a user is recording a digital witness statement, according to one example.

FIG. 2 illustrates a sequence of screen views that may appear on the digital display of a mobile device while a user is recording a digital witness statement, according to one example. In the screen view 200a, a statement-collection application is in a foreground state and causes a waveform graphic 210 to represent input (e.g., the user's voice as the user speaks) that is being received through a microphone that is integrated into the mobile device. An icon 212 also appears on the screen to indicate that the statement-collection application is currently recording the input that is being received by the microphone. The button 214 may be provided, as shown, for the user to indicate when the user is finished providing the digital witness statement. In addition, the text field 220 may display a realtime speech-to-text transcription of the input that is being received through the microphone.

Persons of skill in the art will recognize that there are many software tools available that may be used to produce speech-to-text transcriptions. For example, the Microsoft® Cognitive Services Speech Software Development Kit (SDK), Carnegie Mellon University (CMU) Sphinx, the Google® Cloud Speech Application Programming Interface (API), International Business Machines (IBM) Watson™ Speech to Text, Wit.ai, and Houndify API are a few examples of software tools that can be used to perform to generate a speech-to-text transcription. An exhaustive discussion of the software tools available for voice transcription is beyond the scope of this disclosure.

Next, the user switches to a media player application such that the screen view 200b appears on the digital display of the mobile device. The user views a video file (or a still image file) via the media player application. In this example, suppose the video file (or still image file) was captured by a camera that is integrated into the mobile device while an incident about which the user is providing the digital witness statement occurred. The user may be viewing the video (or still image) to refresh the user's memory. The icon 212 may indicate that the statement-collection application is still recording input received through the microphone even though the statement-collection application is currently in a background state.

Next, the user switches back to the statement-collection application such that the screen view 200c appears on the digital display of the mobile device. The electronic request 216 appears in addition to the icon 212 and the button 214. As shown, the electronic request 216 prompts the witness to submit an item that the user accessed while the digital witness statement was being recorded. The electronic request 216 also includes a file select field 218 and a text field 220. The user can select the video file (or still image file) via the file select field 218 and tap the button 214 to upload the digital witness statement and the video file (or image file). The metadata can be used to trigger the text box to apply special formatting (e.g., highlighting, color coding, italicizing, underlining, or boldfacing) the text transcribed from the portion of the digital witness statement that was recorded while the statement-collection application was in the background state.

Figure 3:
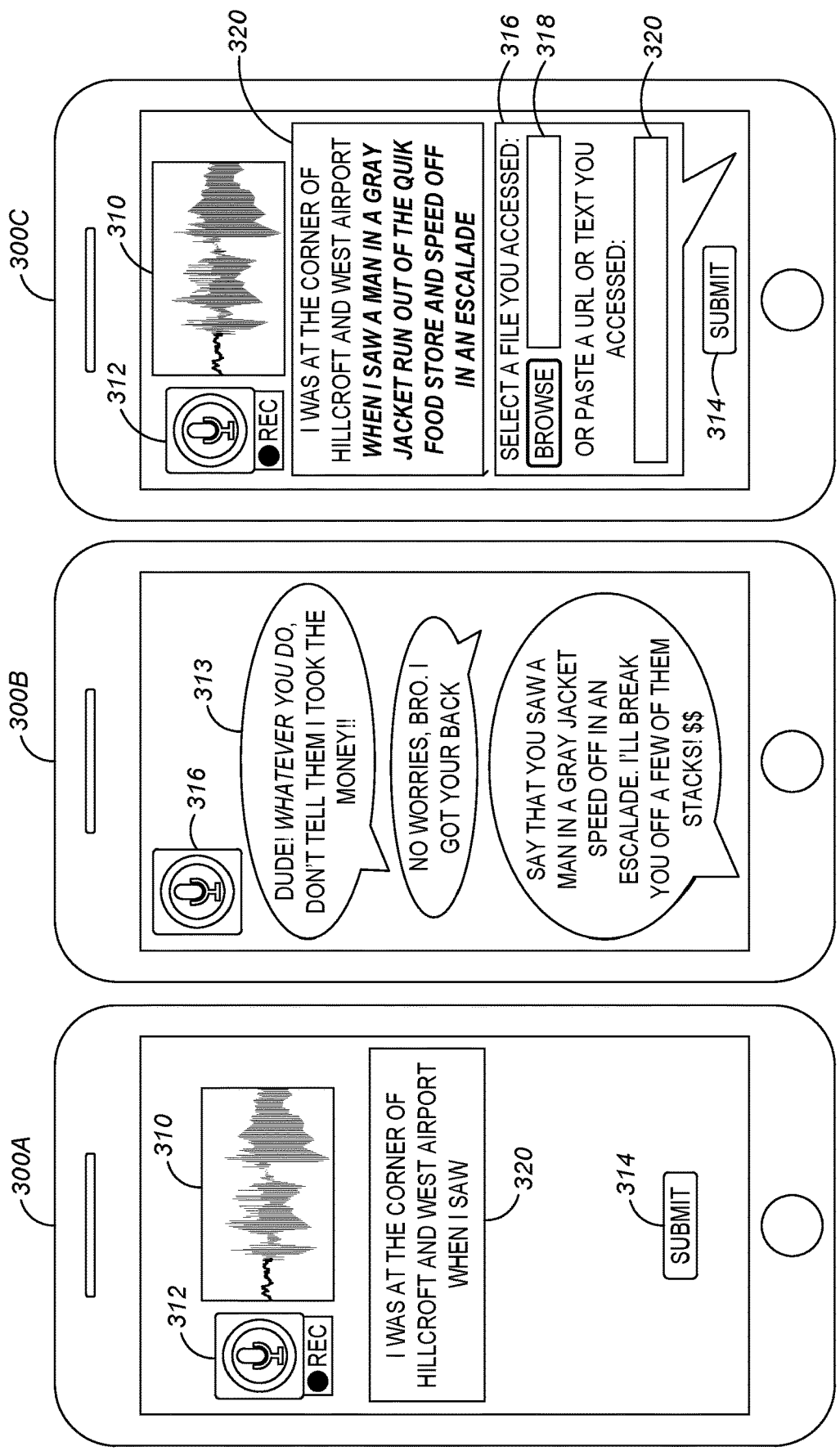
FIG. 3 illustrates another sequence of screen views that may appear on the digital display of a mobile device while a user is recording a digital witness statement, according to one example.

FIG. 3 illustrates another sequence of screen views that may appear on the digital display of a mobile device while a user is recording a digital witness statement, according to one example. In the screen view 300a, a statement-collection application is in a foreground state and causes a waveform graphic 310 to represent input (e.g., the user's voice as the user speaks) that is being received through a microphone that is integrated into the mobile device. An icon 312 also appears on the screen to indicate that the statement-collection application is currently recording the input that is being received by the microphone. The button 314 may be provided, as shown, for the user to indicate when the user is finished providing the digital witness statement. In addition, the text field 320 may display a realtime speech-to-text transcription of the input that is being received through the microphone.

Next, the user switches to a messaging application such that the screen view 300b appears on the digital display of the mobile device. The user views a text message 313 via the messaging application. In this example, suppose the text message 313 was sent by a friend of the user who is asking the user not to identify the friend as the perpetrator of a crime about which the user is currently recording the digital witness statement. The icon 312 may indicate that the statement-collection application is still recording input received through the microphone even though the statement-collection application is currently in a background state.

Next, the user switches back to the statement-collection application such that the screen view 300c appears on the digital display of the mobile device. The electronic request 316 appears in addition to the icon 312 and the button 314. As shown, the electronic request 316 prompts the witness to submit an item that the user accessed while the digital witness statement was being recorded. The electronic request 316 also includes a file select field 318 and a text field 320. The user can paste the content of the text message 313 and any subsequent text messages in the same thread as the text message 313 into the text field 320 and tap the button 314 to upload the digital witness statement and the video file (or image file). The metadata can be used to trigger the text box to apply special formatting (e.g., highlighting, color coding, italicizing, underlining, or boldfacing) the text transcribed from the portion of the digital witness statement that was recorded while the statement-collection application was in the background state.

Figure 4:
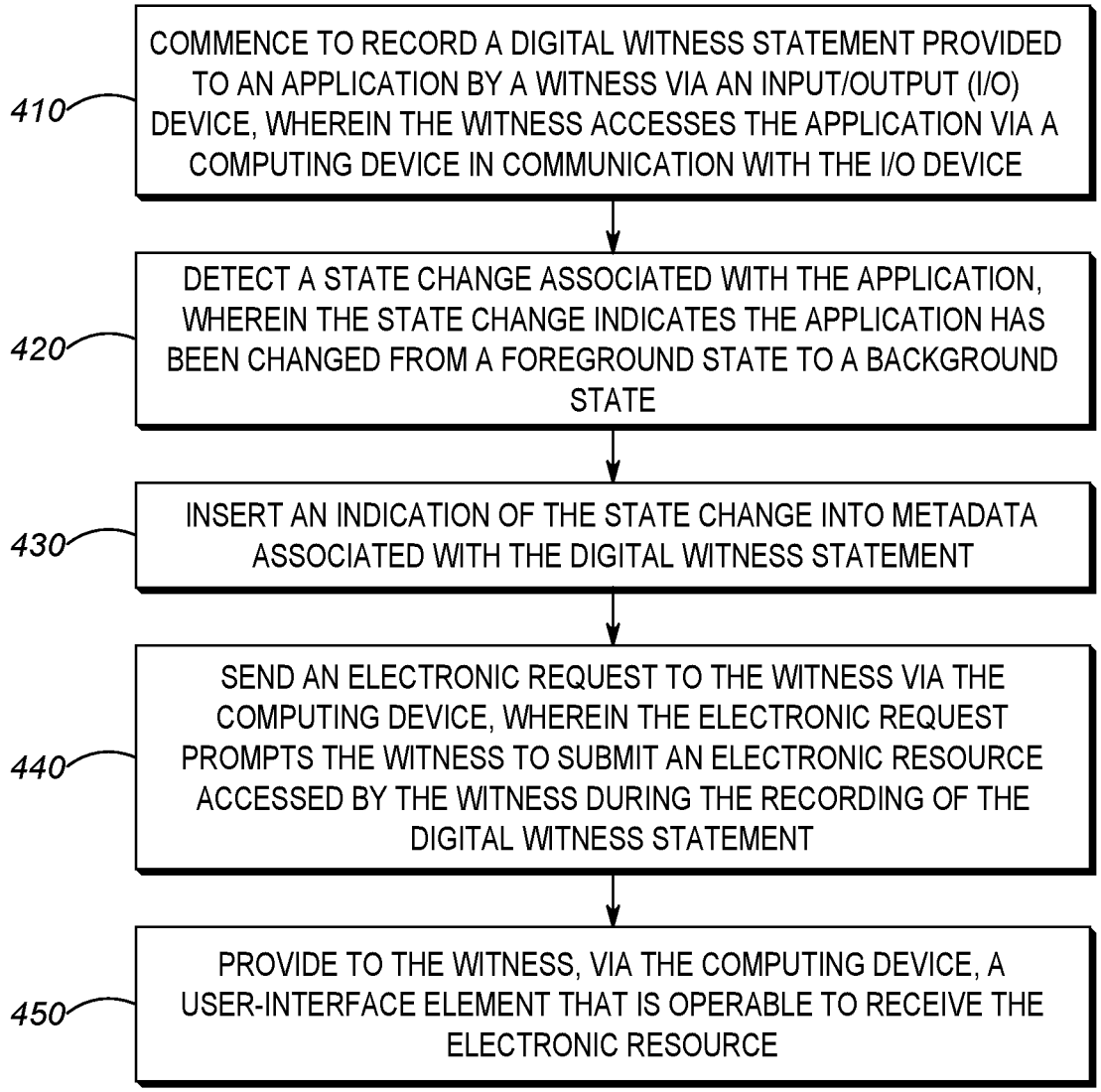
FIG. 4 illustrates additional functionality for systems disclosed herein, according to one example.

FIG. 4 illustrates additional functionality 400 for systems disclosed herein, according to one example. The functionality 400 does not have to be performed in the exact sequence shown. Also, various blocks may be performed in parallel rather than in sequence. Accordingly, the elements of the functionality 400 are referred to herein as "blocks" rather than "steps." The functionality 400 can be executed as instructions on a machine (e.g., by one or more processors), where the instructions are stored on a transitory or non-transitory computer-readable storage medium. While only five blocks are shown in the functionality 400, the functionality 400 may comprise other actions described herein. Also, in some examples, some of the blocks shown in the functionality 400 may be omitted without departing from the spirit and scope of this disclosure.

As shown in block 410, the functionality 400 includes commencing to record a digital witness statement provided to an application by a witness via an input/output (I/O) device, wherein the witness accesses the application via a computing device in communication with the I/O device.

As shown in block 420, the functionality 400 includes detecting a state change associated with the application, wherein the state change indicates the application has been changed from a foreground state to a background state. In one example, the witness accesses the application via a tab in a browser executing on the computing device and detecting the state change associated with the application comprises detecting that the tab has changed from an active state to an inactive state.

As shown in block 430, the functionality 400 includes inserting an indication of the state change into metadata associated with the digital witness statement. The functionality 400 may further include detecting an additional state change associated with the application, wherein the additional state change indicates the application has been changed from the background state back to the foreground state; and inserting an indication of the additional state change into the metadata associated with the digital witness statement. The indication of the state change may comprise a first timestamp; the indication of the additional state change may comprise a second timestamp.

As shown in block 440, the functionality 400 includes sending an electronic request to the witness via the computing device, wherein the electronic request prompts the witness to submit an electronic resource accessed by the witness during the recording of the digital witness statement.

As shown in block 450, the functionality 400 includes providing to the witness, via the computing device, a user-interface element that is operable to receive the electronic resource. The functionality 400 may further comprise receiving the electronic resource via the user-interface element; comparing content found in the electronic resource to content that was recorded in the digital witness statement during a time period ranging from the first timestamp to the second timestamp; generating an indication of consistency between the content of the electronic resource and the content of the digital witness statement that was recorded during the time period based on the comparison; and inserting the indication of consistency into the metadata associated with the digital witness statement. The action of comparing the content found in the electronic resource to the content that was recorded in the digital witness statement may comprise comparing a first application identifier associated with an additional application that was executing on the computing device concurrently with the application during the time period to a second application identifier associated with the electronic resource. The indication of consistency may comprise a Boolean value indicating whether the first application identifier and the second application identifier match. The action of comparing the content found in the electronic resource to the content that was recorded in the digital witness statement may also comprise comparing text extracted from the electronic resource to text extracted from the digital witness statement.

The functionality 400 may also include stopping the recording of the digital witness statement in response to receiving, via the I/O device, an indication via that the digital witness statement has been completed; and transmitting the digital witness statement and the metadata via a network to a server for storage.

Figure 5:
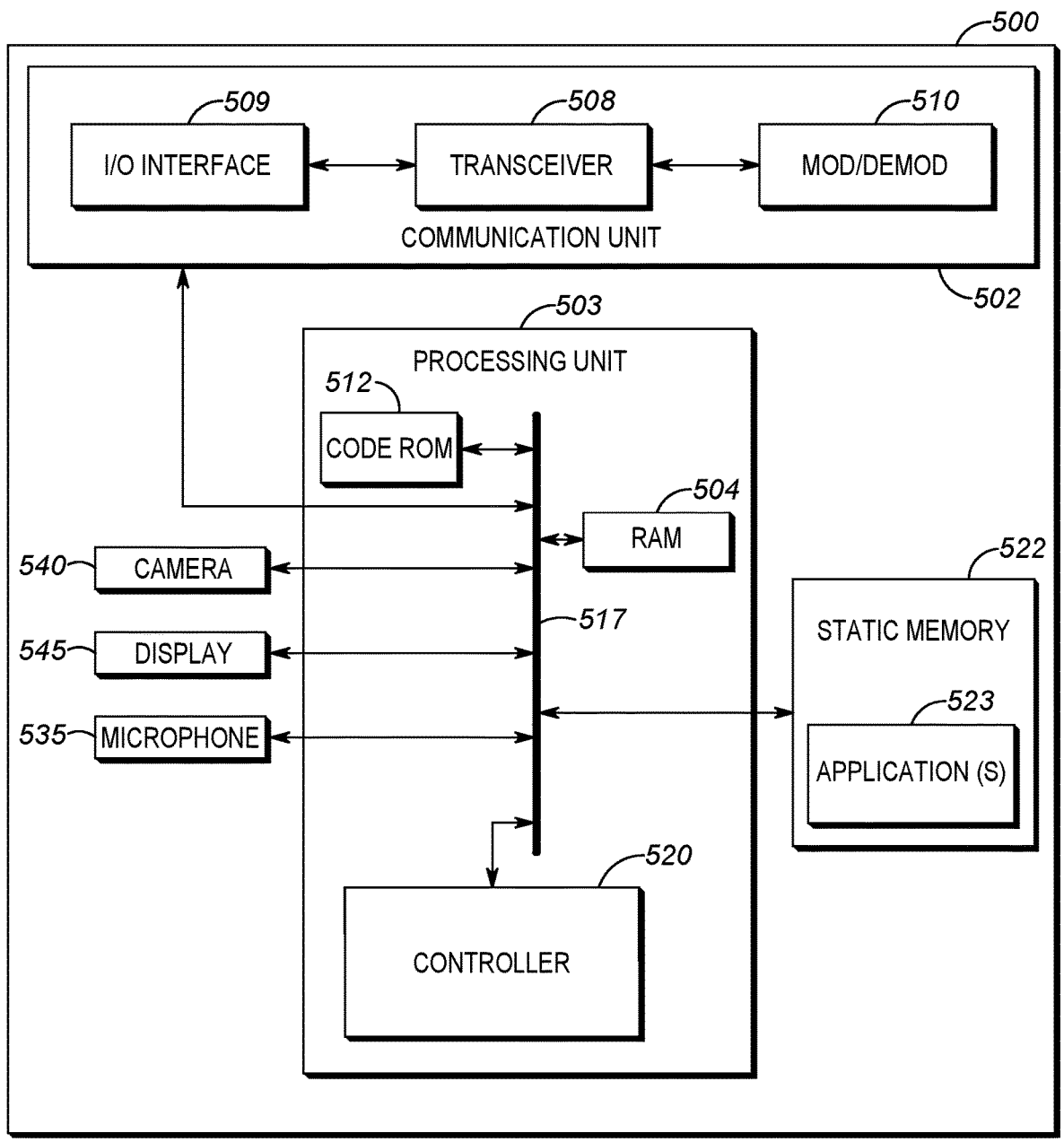
FIG. 5 illustrates a schematic block diagram of a computing device 500, according to one example.

FIG. 5 illustrates a schematic block diagram of a computing device 500, according to one example. The computing device 500 may be configured to record a digital witness statement from a user and upload the digital witness statement, metadata associated therewith, and an electronic resource accessed while the digital witness statement was being recorded to a server via one or more different types of networks (e.g., networks with which the transceivers 508 may be adapted to communicate, as discussed in further detail below).

The computing device 500 may comprise a cellular phone (e.g., a smart phone), a satellite phone, a Voice over Internet Protocol (VoIP) phone, or a computer (e.g., a workstation, a laptop, a mobile tablet computer or a desktop computer) that is equipped with peripherals for recording a digital witness statement (e.g., a keyboard and a microphone 535, and a camera 540).

As depicted, the computing device 500 comprises a communication unit 502, a processing unit 503 (e.g., a processor), a Random-Access Memory (RAM) 504, one or more transceivers 508 (which may be wireless transceivers), one or more wired or wireless input/output (I/O) interfaces 509, a combined modulator/demodulator 510 (which may comprise a baseband processor), a code Read-Only Memory (ROM) 512, a common data and address bus 517, a controller 520, and a static memory 522 storing one or more applications 523.

The computing device 500 may also include a camera 540, a display 545, and a microphone 535 such that a user may use the computing device 500 to record a digital witness statement (e.g., by speaking into the microphone 535, filming the user via the camera 540 while the user is in the act of speaking, or typing the digital witness statement via a virtual keyboard shown on the display 545).

As shown in FIG. 5, the computing device 500 includes the communication unit 502 communicatively coupled to the common data and address bus 517 of the processing unit 503. The processing unit 503 may include the code Read Only Memory (ROM) 512 coupled to the common data and address bus 517 for storing data for initializing system components. The processing unit 503 may further include the controller 520 coupled, by the common data and address bus 517, to the Random-Access Memory 504 and the static memory 522. Persons of skill in the art will recognize that other configurations (e.g., configurations that include multiple buses) may also be used without departing from the spirit and scope of this disclosure.

The communication unit 502 may include one or more wired or wireless input/output (I/O) interfaces 509 that are configurable to communicate with other components and devices. For example, the communication unit 502 may include one or more transceivers 508 or wireless transceivers may be adapted for communication with one or more communication links or communication networks used to communicate with other components or computing devices. For example, the one or more transceivers 508 may be adapted for communication with one or more of the Internet (including public and private Internet Protocol (IP) networks), a private IP wide area network (WAN) including a National Emergency Number Association (NENA) i3 Emergency services IP network (ESInet), a Bluetooth network, a Wi-Fi network, for example operating in accordance with an Institute of Electrical and Electronics Engineers (IEEE) 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network or other types of GSM networks, a 5G (including a network architecture compliant with, for example, the Third Generation Partnership Project (3GPP) Technical Specification (TS) 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, a landline telephonic network, a Low Earth Orbit (LEO) network (e.g., for satellite phones or Internet connection), a Geosynchronous Orbit (GEO) network (e.g., for satellite phones), an Evolution-Data Optimized (EV-DO) network, an Enhanced Data Rates for Global Evolution (EDGE) network, or another similar type of wireless network. Hence, the one or more transceivers 508 may include, but are not limited to, a cell phone transceiver, a Bluetooth transceiver, a CBRS transceiver, a Wi-Fi transceiver, a WiMAX transceiver, or another similar type of wireless transceiver configurable to communicate via a wireless radio network.

The one or more transceivers 508 may also comprise one or more wired transceivers, such as an Ethernet transceiver, a USB (Universal Serial Bus) transceiver, or similar transceiver configurable to communicate via a twisted pair wire, a coaxial cable, a fiber-optic link, or a similar physical connection to a wired network. The one or more transceivers 508 are also coupled to a combined modulator/demodulator 510.

The controller 520 may include ports (e.g., hardware ports) for coupling to other hardware components or systems (e.g., components and systems described with respect to FIG. 1). The controller 520 may also comprise one or more logic circuits, one or more processors, one or more microprocessors, one or more ASIC (application-specific integrated circuits), one or more FPGA (field-programmable gate arrays), or other electronic devices.

The static memory 522 is a non-transitory machine readable medium that stores machine readable instructions to implement one or more programs or applications (e.g., such as the statement-collection application 112 and the resource analyzer 124 described with respect to FIG. 1). Example machine readable media include a non-volatile storage unit (e.g. Erasable Electronic Programmable Read Only Memory ("EEPROM"), Flash Memory), or a volatile storage unit (e.g. random-access memory ("RAM")). In the example of FIG. 5, programming instructions (e.g., machine readable instructions) that implement the functional teachings of the computing device 500 as described herein are maintained, persistently, at the static memory 522 and used by the controller 520, which makes appropriate utilization of volatile storage during the execution of such programming instructions.

When the controller 520 executes the one or more applications 523, the controller 520 is enabled to perform one or more of the aspects of the present disclosure set forth earlier in the present specification (e.g., the computing device blocks set forth in FIG. 4). The one or more applications 523 may include programmatic algorithms, and the like, that are operable to perform electronic functions described with respect to FIGS. 1-4.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement virtual constructs in computing devices, among other features and functions set forth herein).

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The claimed matter is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some examples may comprise of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory)

and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and Integrated Circuits (ICs) with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Examples are herein described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
commencing to record a witness statement provided to an application by a witness via an input/output (I/O) device, wherein the witness accesses the application via a computing device in communication with the I/O device;
detecting a state change associated with the application, wherein the state change indicates the application has been changed from a foreground state to a background state;
inserting an indication of the state change into metadata associated with the witness statement;
sending an electronic request to the witness via the computing device, wherein the electronic request prompts the witness to submit an electronic resource accessed by the witness during the recording of the witness statement; and
providing to the witness, via the computing device, a user-interface element that is operable to receive the electronic resource.

2. The method of claim 1, further comprising:
detecting an additional state change associated with the application, wherein the additional state change indicates the application has been changed from the background state back to the foreground state; and
inserting an indication of the additional state change into the metadata associated with the witness statement.

3. The method of claim 2, wherein the indication of the state change comprises a first timestamp, and wherein the indication of the additional state change comprises a second timestamp.

4. The method of claim 3, further comprising:
receiving the electronic resource via the user-interface element;
comparing content found in the electronic resource to content that was recorded in the witness statement during a time period ranging from the first timestamp to the second timestamp;
generating an indication of consistency between the content of the electronic resource and the content of the witness statement that was recorded during the time period based on the comparison; and
inserting the indication of consistency into the metadata associated with the witness statement.

5. The method of claim 4, wherein comparing the content found in the electronic resource to the content that was recorded in the witness statement comprises:

comparing a first application identifier associated with an additional application that was executing on the computing device concurrently with the application during the time period to a second application identifier associated with the electronic resource, wherein the indication of consistency comprises a Boolean value indicating whether the first application identifier and the second application identifier match.

6. The method of claim 4, wherein comparing the content found in the electronic resource to the content that was recorded in the witness statement comprises: comparing text extracted from the electronic resource to text extracted from the witness statement.

7. The method of claim 1, further comprising:

stopping the recording of the witness statement in response to receiving, via the I/O device, an indication via that the witness statement has been completed; and transmitting the witness statement and the metadata via a network to a server for storage.

8. The method of claim 1, wherein the witness accesses the application via a tab in a browser executing on the computing device, and wherein detecting the state change associated with the application comprises detecting that the tab has changed from an active state to an inactive state.

9. A non-transitory computer-readable storage medium containing instructions that, when executed by one or more processors, perform a set of actions comprising:

commencing to record a witness statement provided to an application by a witness via an input/output (I/O) device, wherein the witness accesses the application via a computing device in communication with the I/O device;

detecting a state change associated with the application, wherein the state change indicates the application has been changed from a foreground state to a background state;

inserting an indication of the state change into metadata associated with the witness statement;

sending an electronic request to the witness via the computing device, wherein the electronic request prompts the witness to submit an electronic resource accessed by the witness during the recording of the witness statement; and providing to the witness, via the computing device, a user-interface element that is operable to receive the electronic resource.

10. The non-transitory computer-readable storage medium of claim 9, wherein the set of actions further comprises:

detecting an additional state change associated with the application, wherein the additional state change indicates the application has been changed from the background state back to the foreground state; and inserting an indication of the additional state change into the metadata associated with the witness statement.

11. The non-transitory computer-readable storage medium of claim 10, wherein the indication of the state change comprises a first timestamp, and wherein the indication of the additional state change comprises a second timestamp.

12. The non-transitory computer-readable storage medium of claim 11, wherein the set of actions further comprises:

receiving the electronic resource via the user-interface element;

comparing content found in the electronic resource to content that was recorded in the witness statement during a time period ranging from the first timestamp to the second timestamp;

generating an indication of consistency between the content of the electronic resource and the content of the witness statement that was recorded during the time period based on the comparison; and inserting the indication of consistency into the metadata associated with the witness statement.

13. The non-transitory computer-readable storage medium of claim 12, wherein comparing the content found in the electronic resource to the content that was recorded in the witness statement comprises:

comparing a first application identifier associated with an additional application that was executing on the computing device concurrently with the application during the time period to a second application identifier associated with the electronic resource, wherein the indication of consistency comprises a Boolean value indicating whether the first application identifier and the second application identifier match.

14. The non-transitory computer-readable storage medium of claim 12, wherein comparing the content found in the electronic resource to the content that was recorded in the witness statement comprises:

comparing text extracted from the electronic resource to text extracted from the witness statement.

15. The non-transitory computer-readable storage medium of claim 9, wherein the set of actions further comprises:

stopping the recording of the witness statement in response to receiving, via the I/O device, an indication via that the witness statement has been completed; and transmitting the witness statement and the metadata via a network to a server for storage.

16. The non-transitory computer-readable storage medium of claim 9, wherein the witness accesses the application via a tab in a browser executing on the computing device, and wherein detecting the state change associated with the application comprises detecting that the tab has changed from an active state to an inactive state.

17. A system comprising:

one or more processors; and a memory containing instructions thereon which, when executed by the one or more processors, cause the processors to perform a set of actions comprising:

commencing to record a witness statement provided to an application by a witness via an input/output (I/O) device, wherein the witness accesses the application via a computing device in communication with the I/O device;

detecting a state change associated with the application, wherein the state change indicates the application has been changed from a foreground state to a background state;

inserting an indication of the state change into metadata associated with the witness statement;

sending an electronic request to the witness via the computing device, wherein the electronic request prompts the witness to submit an electronic resource accessed by the witness during the recording of the witness statement; and providing to the witness, via the computing device, a user-interface element that is operable to receive the electronic resource.

18. The system of claim 17, wherein the set of actions further comprises:
   detecting an additional state change associated with the application, wherein the additional state change indicates the application has been changed from the background state back to the foreground state; and
   inserting an indication of the additional state change into the metadata associated with the witness statement.

19. The system of claim 18, wherein the indication of the state change comprises a first timestamp, and wherein the indication of the additional state change comprises a second timestamp.

20. The system of claim 19, wherein the set of actions further comprises:
   receiving the electronic resource via the user-interface element;
   comparing content found in the electronic resource to content that was recorded in the witness statement during a time period ranging from the first timestamp to the second timestamp;
   generating an indication of consistency between the content of the electronic resource and the content of the witness statement that was recorded during the time period based on the comparison; and
   inserting the indication of consistency into the metadata associated with the witness statement.

* * * * *